Jan. 1, 1929.  1,697,368
J. REAM
DREDGE RAKE
Filed Nov. 29, 1926   2 Sheets-Sheet 2
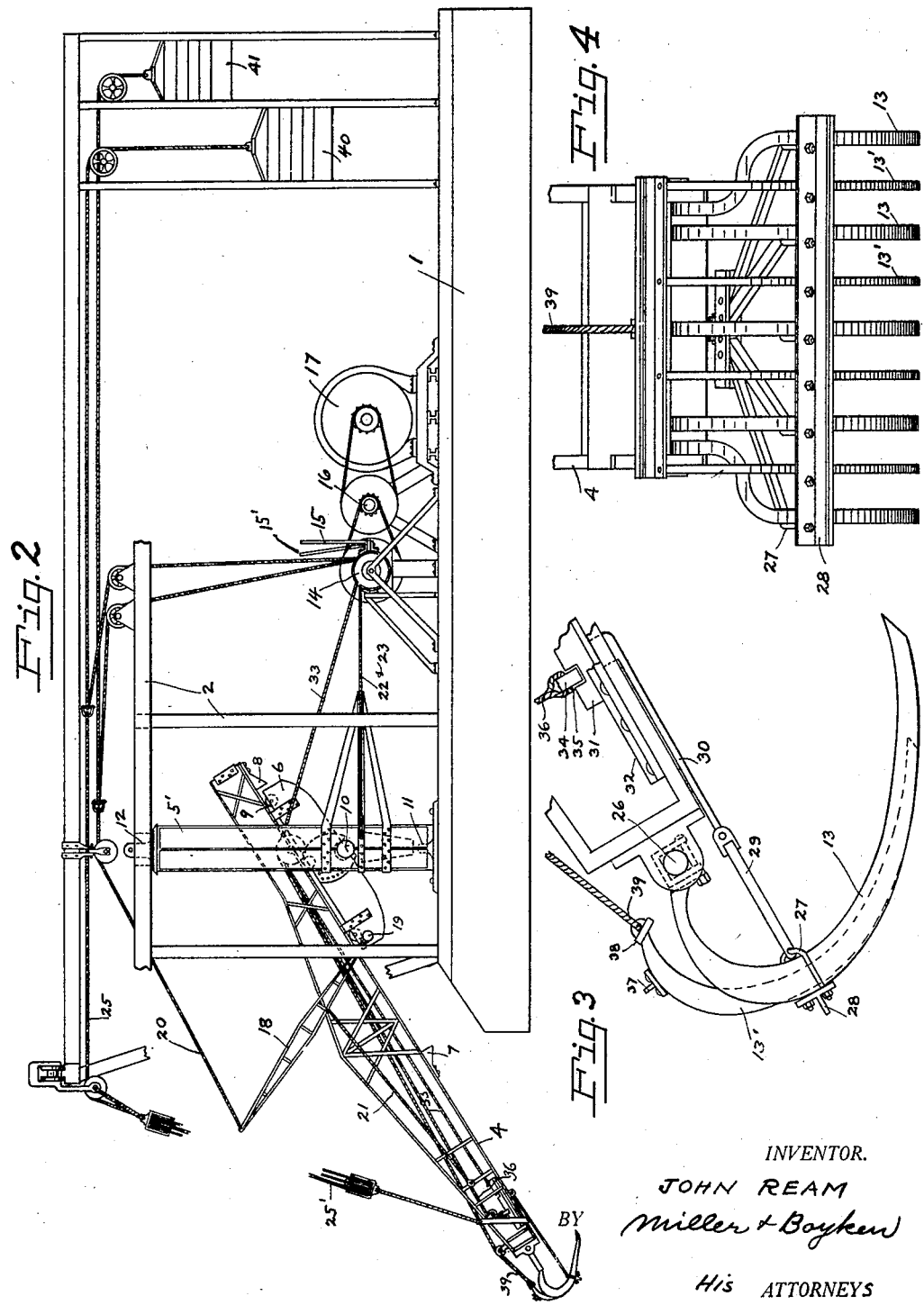
INVENTOR.
JOHN REAM
BY Miller & Boyken
His ATTORNEYS Patented Jan. 1, 1929.

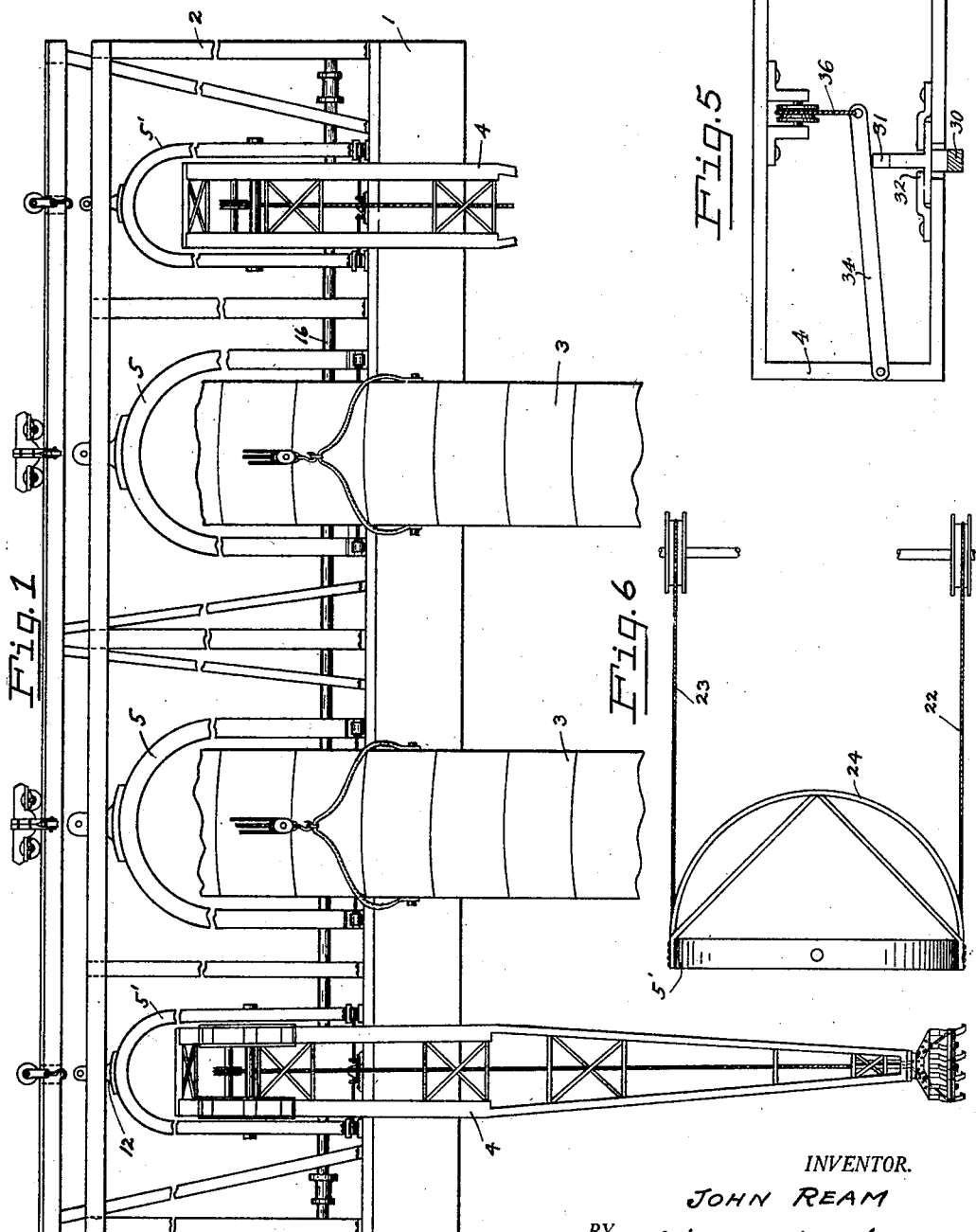

1,697,368

UNITED STATES PATENT OFFICE.

JOHN REAM, OF SACRAMENTO, CALIFORNIA.

DREDGE RAKE.

Application filed November 29, 1926. Serial No. 151,313.

This invention relates to the art of dredging—particularly gold dredging wherein bucket dredgers dig gravel out of a waterway and carry the same upward to the separating apparatus of the dredge in an endless chain of digger buckets.

The object of the within described invention is to provide a power operated rake, preferably in combination with a gold dredger of the type described so that large boulders may be raked from the path of the dredger and deposited on the side or bank, and when desired the smaller gravel may be raked toward the digging buckets.

Also, such a rake with adjustable teeth so that they may be moved to various angles, and also with some of the teeth arranged so that they may be swung out of raking position so as to provide a wider separation between the active teeth.

In the drawings accompanying this apparatus I show one embodiment of my invention in connection with a gold dredger, Fig. 1 being a view of the front end of a gold dredger of the endless chain bucket type with two of my rakes mounted respectively to the outer sides of the digging buckets, one rake only being shown complete and the digging buckets being broken away, as aside from their mounting and the cooperation of my rakes therewith they are not involved in this application.

Fig. 2 is a side elevation of the dredger showing one rake only and with digging buckets omitted to avoid confusion.

Fig. 3 is an enlarged side view of the lower end of the rake.

Fig. 4 is an end view of Fig. 3. Fig. 5 is a detached detail of the latch bar for holding the rake teeth in adjusted position and Fig. 6 is an enlarged plan view of the turntable mechanism used for the rake mountings on the scow and also for the mountings of the digger buckets.

In the figures 1 represents a dredger scow or hull upon which suitable derrick framework 2 is constructed to support in this showing two lines of digging buckets 3 and at the outside of those buckets two slidable and revolvable rake handles 4.

No description of the digging buckets will be entered apart from the fact that they are preferably mounted on the hull, each in a vertically pivoted yoke 5 carried so that the line of buckets may be swung from side to side in an arc without turning the whole dredger, and as this mounting in respect to the vertical pivoting is the same for the rakes it will be more fully described later.

The handles 4 of the rakes comprise each a trussed girder which is slidable back and forth on a carriage 6 within limits of stops 7—8. The weight of the handle is taken on rollers 9 and the carriage is tiltably supported on a horizontal axis 10 carried on a yoke 5' revolvable on vertical pivots 11—12 supported respectively by the hull 1 and the frame 2, the arrangement being such that the rake handle may be swung from side to side on the vertical pivots, oscillated up and down on the horizontal pivots and moved back and forth on the carriage, thus it may be lowered to the bottom of a waterway and the rake teeth 13 dragged over the bottom in any direction or lifted from any position.

In order to effect the various movements as permitted by the pivotal mounting described a series of cables is provided and operated by any suitable set of winch drums as at 14, each controlled by a suitable clutch and brake lever as at 15, 15' the drums being preferably all operated from a common countershaft 16 operated by any desired form of prime mover but here indicated as an electric motor 17.

To control the back and forth sliding of the rake handle I provide a lever 18 pivoted at its lower end at 19 to the carriage 6 and fastened to a pull cable 20 at its outer end passing to the hoist and suitably supported in sheaves as shown, while at a point about one-third from the bottom of the lever 18 I connect a cable 21 directly forward to a portion of the handle frame, so that by pulling the lever 18 by means of the rope 20 the power to slide the handle upward and backward on the carriage will be increased in proportion to the leverage, and upon slacking off on rope 20 the handle will roll downward and outward.

To swing the rake sidewise ropes 22—23 secured to opposite sides of the yoke 5' and seating themselves in a grooved arcuate member 24 are alternately operated by the hoist to swing the handle either way.

To raise and lower the rake on its tiltable carriage 6 a cable 25 from the hoist extends to the lower end of the handle and is preferably compounded by pulley blocks at 25'.

The rake has two sets of teeth or tines, a main set 13 pivoted at 26 to the rake handle and each tooth embraced in a U bolt 27 secured to a cross bar 28, the U bolts all being linked as at 29 to a rod 30 extending from an angle bar 31 slidable in guides 32 on the rake handle. The angle bar is pulled along in its guides by a rope 33 passing to one of the hoist drums, and is locked in different positions by means of a pivoted latch bar 34 dropping into any of several notches 35 formed in the angle bar 31, and which latch may be released by the hoist operator by means of a rope 36.

Between the main teeth 13 of the rake is a smaller set of teeth 13′ loosely positioned against the cross bar 28 at an intermediate position and fastened together at their upper ends by bars 37 and 38, the latter being connected to a cable 39 extending to a hoist drum so that the intermediate set of teeth may be pulled up any desired amount from the larger teeth so as to cooperate with them as a fine rake for small gravel or when retracted permit the passage of small gravel while large boulders will be retained on the main teeth. The small teeth 13′ rest against the cross bar 28 and are positioned by passing freely through intermediate U bolts 27, and the adjustment of cable 39 holds them in any desired relation to the main teeth 13.

On account of the great size and weight of the rake parts in a machine of this character in operation they will always fall out or away by gravity and need therefore only to be pulled to carry them in the reverse direction; however, it is also contemplated that some of the weight of the rake handle be counterbalanced by attaching suitable counterweights to the pulling cables 20—25 as indicated at 40 and 41.

In operation the rakes are run forward and downward on their carriages 6, the teeth of the rake are given any angle desired and by pulling the rake handle backward the material is raked toward the dredger for handling by the digging buckets 3, tho when large boulders are encountered the smaller rake teeth 13′ are withdrawn by taking up on cable 39, and the large boulders carried bodily on the main rake teeth 13 to one side out of the path of the dredger.

I claim:

1. A scow, a rake extending from said scow, said rake being provided with a handle and said scow provided with means supporting said handle and said handle being movable back and forth on the supporting means and said supporting means being tiltable up and down and swingable sidewise.

2. A scow, a rake extending from said scow, said rake being provided with a handle and said scow provided with means supporting said handle and said handle being movable back and forth on the supporting means and said supporting means being tiltable up and down and swingable sidewise and hoist means on said scow arranged for moving said handle and said supporting means.

3. A scow, a rake extending from said scow, said rake being provided with a handle and said scow provided with means supporting said handle and said handle being movable back and forth on the supporting means and said supporting means being tiltable up and down and swingable sidewise and hoist means on said scow arranged for moving said handle up and down and tilting and swinging said supporting means.

4. A scow, a yoke frame supported thereon on vertical pivots, a tiltable carriage supported on the yoke frame on horizontal pivots, rollers on said carriage, a trussed rake handle resting on said carriage rollable back and forth on said rollers, power means for moving said handle on said rollers, and a rake at the end of said trussed handle, said power means including a lever pivoted to said carriage, a rope extending from the lever to said trussed handle, and a rope extending from the handle to a hoist on said scow.

5. A gold dredge of the endless chain digger bucket type, a rake universally mounted thereon arranged to extend into the water adjacent the digger buckets and means for moving said rake universally.

6. A gold dredge of the endless chain digger bucket type, a rake mounted thereon arranged to extend into the water adjacent the digger buckets, means for operating said rake, for raking material toward said buckets and the teeth of said rake being adjustable whereby they can support a boulder for carrying thereon during the movement of said rake.

7. A gold dredge of the endless chain digger bucket type, a rake universally mounted thereon arranged to extend into the water adjacent the digger buckets, means for operating said rake with universal movement and said digger buckets being mounted for swinging movement.

JOHN REAM.